Figure 1:
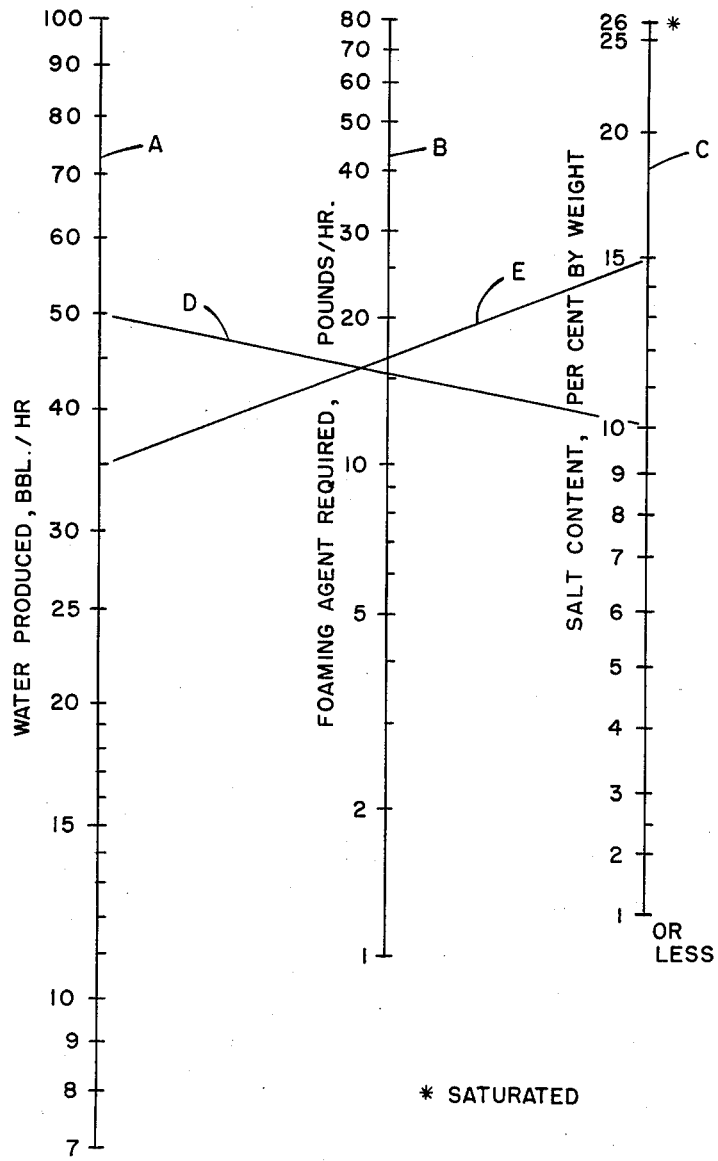

United States Patent Office 3,223,186
Patented Dec. 14, 1965

3,223,186
METHOD OF DRILLING WITH AIR OR GAS
James L. Lummus and Billy V. Randall, Tulsa, Okla., assignors to Pan American Corporation, Tulsa, Okla., a corporation of Delaware
Filed May 23, 1962, Ser. No. 198,415
2 Claims. (Cl. 175—71)

This is a continuation-in-part of our application Serial No. 733,863, filed May 8, 1958, now abandoned.

The present invention relates to improvements in the drilling of wells with conventional rotary drilling tools, in which air or gas is used as the circulating fluid in place of mud. This type of operation is known in the art as "air drilling" and is employed in the drilling of both shallow holes, such as are used in seismic work, and deep wells producing oil and/or gas.

Specifically, our invention is concerned with the use of certain classes of foaming agents having particular characteristics suitable for the removal from the well of cuttings and excessive quantities of water when encountered during drilling with air or gas. As a particular feature of the present invention, a procedure is taught herein for determining what classes of such agents possess said characteristics and the specific circumstances under which they are operative. Also foaming agent compositions are discussed which are suitable for the removal of cuttings and water from the well while drilling wherein the salinity of the water may vary over a wide range.

The technique of drilling wells with air, natural gas or equivalent gases, all of which are hereinafter referred to as "gas," is a development which has been employed in the drilling of oil wells for a period of approximately twenty years. For a number of reasons, however, this method did not receive much attention until about ten years ago, when various combinations of circumstances pointed to several advantages in gas drilling. Some of the first large scale drilling operations occurred in the San Juan Basin. In this area, water for conventional rotary drilling, was difficult to obtain. Large supplies of gas were available and the formations being drilled in that locality gave very little, if any, trouble, from the standpoint of water entry. With this type of operation in formations suited for gas drilling, higher penetration rates and longer bit life can be realized than are possible when using mud as the circulating fluid.

One of the principal disadvantages, however, in drilling with gas, has been the difficulty of removing cuttings in the presence of appreciable quantities of formation water. The presence of a considerable quantity of water in the well bore is shown by a spray of water or wet cuttings from the exhaust line or by increasing back pressure. In some instances, the rate of water entry into the well is so high that the back pressure exerted on the gas line by the head of liquid in the hole, either causes a material reduction in drilling rate or results in a complete stoppage of drilling operations, owing to the fact that the compressor capacity is insufficient to lift the slurry of water and cuttings out of the hole. In cases of this sort, expensive water shut-off procedures must be employed before gas drilling can be resumed, or the rest of the hole must be made using mud as the circulating agent resulting in a very substantial decrease in drilling rate.

It is an object of our invention to provide a method for the efficient removal of bit cuttings and troublesome quantities of water encountered during drilling operations. It is another object of our invention to provide foaming agent compositions suitable for use in gas drilling through water producing formations, wherein the water may be fresh or vary in salinity over a wide range. It is still another object of our invention to provide a means for determining the type of foaming agent best suited for a wide range of formations and well bore liquid compositions. It is a further object of our invention to provide a method by which well bore liquids and cuttings can be satisfactorily removed from deep (in excess of about 5,000 feet) wells during air drilling.

While it has not been found too difficult to remove water and bit cuttings from the well bore by means of foam during air drilling at depths less than about 5,000 feet, the problem of removing water and cuttings, increases in magnitude at greater depths. Thus, the requirement placed on a foam for satisfactory performance at these greater depths, becomes quite severe, particularly with regard to foam stability. Many factors complicate this problem, for example, the type and amount of cuttings produced, the presence of hydrocarbons, velocity of the gas and the hole size, all affect foam stability. It is to this problem, i.e., the maintenance of stable foams in deep wells, that the process of our invention is primarily directed.

In accordance with an embodiment of our invention, a foaming agent having a suitable foam index, as will be hereinafter defined, is injected into the high pressure gas line leading to the drill pipe. The foaming agent is preferably first mixed with water, prior to introduction thereof into the system, although certain of these agents, which are solids, may be added dry by means of a suitable solids injector, provided the temperature of the circulating gas is below the melting point of the solid material. If the quantity of water produced is not enough to come out of the exhaust line continuously when the foaming agent is added, water containing the foaming agent should be pumped into the gas line at a rate of from about 5 to about 20 barrels per hour. The proper rate of addition of foaming agent and water is indicated when the circulating pressure remains low and constant and foam and cuttings are continuously discharged from the exhaust line. Also, where low water influx rates are involved, a solution of foaming agent, for example, about 10 barrels of water containing one to three pounds of foaming agent, may be added at appropriate intervals. This treatment tends to disperse sticky bit cuttings, allowing them to be lifted up the hole with the foam. Where the influx of water exceeds 50 or 60 barrels per hour, steps should be taken to at least partially shut-off water-flow by means of an oil squeeze or similar procedure. Such treatment substantially reduces the permeability of the affected formation to water and would allow foam drilling to continue.

Addition of foaming agent is, of course, dependent on the rate of water entry. Ordinarily, the concentration of agent in the well bore should be from about .005 to about .5 weight percent based on the water therein. On this basis, the preferred concentration of foaming agent may generally range from about .01 to about .2 weight percent. Higher concentrations of foaming agent may be used; however, little improvement is observed when amounts in excess of .5 weight percent are employed.

Gas injection rates may vary widely with hole conditions. In actual practice, the annular return velocities most frequently used are from 2,000 to 3,000 feet per minute, or higher. These velocities, however, may be increased or decreased. Under average drilling conditions, a total of about 3,000,000 cubic feet of gas per day, is used.

As soon as possible after water influx is detected, the salinity thereof should be determined. This can be done by installing a trap at the bottom of the return flow line from the well. Water can be withdrawn from the trap at suitable intervals and analyzed for sodium chloride and/or similar salts. This is important since the efficiency with which many foaming agents function decreases sharply with increasing salinity. A wide range of foaming agents suitable for use in fresh water, but sensitive to increasing salinity, can be rendered suitable for use in strong formation brines by employing certain solubilizing materials in combination with such foaming agents. These solubilizers tend to increase the solubility of the foaming agent in brines. The solubilizing agents are generally surface active themselves, however, the important feature is that they possess a grouping that is highly water-soluble and tends to impart a high degree of water-solubility to molecule having this group. For example, the presence of ethylene oxide linkages and/or sulfate groups in compounds mixed with foaming agents ordinarily slightly soluble in brine, render said agents highly soluble therein. As examples of compounds suitable for use as solubilizing agents in the present invention, there may be mentioned alkylated phenols having from about 4 to 35 or 40 ethylene oxide groups linked to the oxygen atom of the phenol group, high molecular weight alcohols, such as tridecyl alcohol, having 15 to 20 ethylene oxide groups attached through the alcohol group, polymers having a molecular weight of 7,000 to 8,000 prepared from propylene oxide with two or three side chains of ethylene oxide, and the like. The alkyl group in the above-mentioned alkylated phenols may, in general, range from about 8 to 18 carbon atoms, with those having from about 9 to 12 carbon atoms ordinarily being preferred. In some instances the above-mentioned alkyl ethoxylated phenols may be modified by esterifying the terminal ethanol group with the sulfuric acid to form the sulfate ester and thereafter converting this product into the corresponding alkali metal or alkaline earth metal salt. In this connection the term "alkaline earth metal" as used herein is intended to include the ammonium salts of such esters. As examples of these salts there may be mentioned. The ammonium, sodium, potassium and calcium salts of a sulfate ester of an alkylphenoxypoly (ethyleneoxy) ethanol. Generally, these solubilizing agents may be combined with the regular foaming agents in an amount corresponding to from about 25 to about 50 weight percent of the total mixture. Usually, concentrations of 30 to 35 weight percent of the total mixture are preferred.

With regard to the effect of salinity and/or water influx rate on the quantity of foaming agent required to form a foam in the well capable of carrying water and cuttings out of the hole, reference is made to FIGURE 1 of the drawings. In this figure, Scale A designates the rate of water influx. Scale B, or the center column, shows pounds of foaming agent to be added per hour, and Scale C designates the salinity of the entering water. The data on which FIGURE 1 is based were obtained by using a foaming agent consisting essentially of about 30 weight percent of the ammonium salt of the sulfate ester of nonylphenoxytetra (ethyleneoxy) ethanol and about 70 weight percent of a modified fatty acid amine condensate. This condensate may be prepared, for example, by reacting about 2 mols of diethanolamine with about 1 mol of a $C_{12}$ to $C_{14}$ fatty acid or a mixture thereof, such as is found in cocoanut oil fatty acids, and neutralizing the excess amine with dodecyl benzene sulfonic acid. Other neutralizing agents such as the fatty acids, for example, stearic acid and oleic acid, or chlorosulfonic acid, benzene sulfonic acid, dodecyl sulfonic acid, and the like, may be used. Further details as to the preparation of the aforesaid condensate are to be found in U.S. Patent 2,586,496 and 2,599,391. The foam index of 0.5 weight percent of this material in water containing 26 weight percent salt (saturated), was 230. Scales A, B, and C of FIGURE 1, are so calibrated that a straight line D, drawn, for example, through a point on Scale A to any point on Scale C, immediately fixes the amount of foaming agent required (as indicated on Scale B) at the salt concentration shown by the intersection of said line with Scale C. Any combination of conditions, i.e., water influx, salt concentration and foaming agent concentration, obtained by the use of a straight line drawn through the aforesaid scales in the manner discussed above, produce a system in which the foam index is at least about 200 to 230. Similarly, the system defined by intersection of line E with Scales A, B, and C, would have a foam index in excess of about 200 to 230. For any foaming agent which (when tested in a liquid medium of the composition shown on Scale C) will produce a foam index of 200 to 230, the quantity of foaming agent required per hour at a given water entry rate and salinity, can be determined by reference to FIGURE 1.

Generally speaking, a foaming agent to be useful in the process of our invention, should possess a number of diverse characteristics. First of all it should possess the ability to form foam rapidly at the gas-water interface in the well bore. It should, in addition, produce a foam stable under gas drilling conditions. This latter property is closely associated with the surface tension of the foam produced. In the majority of instances, it has been found that for satisfactory operation, the surface tension of the foam produced should be from about 25 to 30 dynes/cm.$^2$ and preferably from about 27 to about 29 dynes/cm.$^2$.

Figure 2:
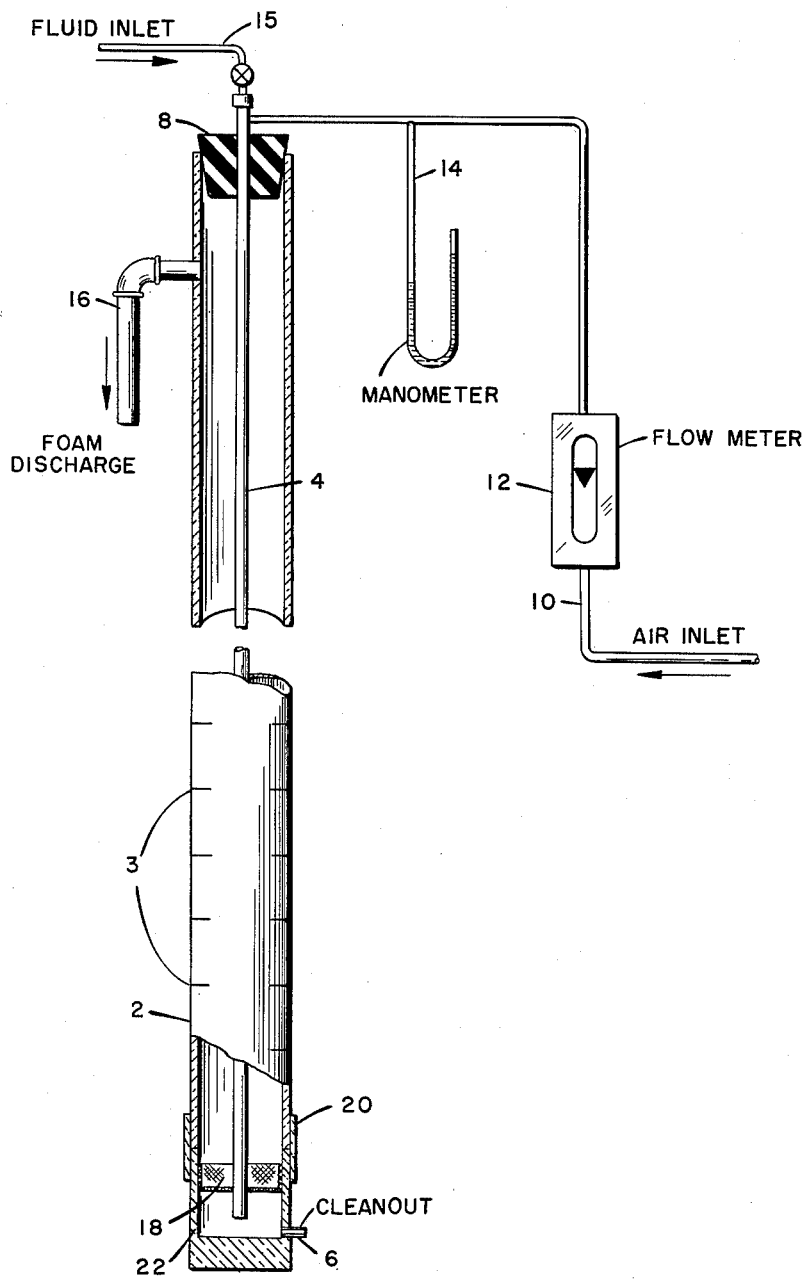

As previously mentioned, the foam index indicates whether or not a foaming agent will be suitable in the present invention. This index, however, is dependent on the rate of foam formation and foam stability. Such properties of the foaming agent may be established in any of a number of different ways. However, in general, it is preferred to obtain this information in the manner specifically described below, referring, where necessary, to the apparatus diagrammatically shown in FIGURE 2. The apparatus of FIGURE 2, is composed of a column 2, for example, 5½ feet high, 2½ inches I.D. and constructed of a clear plastic, such as Lucite. For purposes to be subsequently explained in detail, column 2 has a number of appropriately spaced reference levels 3. Concentrically placed in column 2 is a stainless steel or equivalent tube 4, preferably ¾ inch O.D. This tube is preferably cut to stand approximately ¼ inch off the base of column 2. A cleanout plug 6, about ¼ inch O.D., at the base of column 2, may be removed to withdraw extraneous matter from the column when required. At the top of column 2, a tightly fitting plug 8 serves to hold tube 4 in proper position. Air flowing through inlet line 10 and into the system, is measured by flow meter 12. A suitable manometer 14 is hooked up to the system to indicate the magnitude of positive air pressured during operation. Valved fluid inlet line 15 is used to introduce the test solution into the system via tube 4. A line 16 near the top of column 2, about one inch I.D. and which may likewise be plastic, removes foam from the system so that the quantity produced over a given period can be measured. A screen 18, located about 2 inches from the base of tube 4, is employed to hold bit cuttings in tests where it is desired to determine the cuttings carrying capacity of the foaming agent under investigation. This screen may be removed by slipping plastic ring 20 off column 2 and removing the base 22 thereof.

A preferred method of using the apparatus shown in FIGURE 2 for screening foaming agents, is as follows. One liter of the solution to be evaluated is placed in column 2, via line 15, air is introduced through pipes 10 and 4 at the rate of 2 cubic feet per minute and measured at test temperature (usually 78° F.) for ten minutes. The foam produced during this interval is discharged into a receiver or receivers of known volume, for example, one or more liter beakers, and the foam volume estimated. In order to accurately measure the amount of liquid removed, the foam is broken by addition of a small amount of tributyl phosphate or equivalent material, and the volume of liquid resulting from this step is recorded. The latter indicates the water carrying capacity of the foaming agent.

In the determination of a good foaming agent for the process of our invention, it is necessary to know the foam generating ability of the particular agent to be used and the stability of the foam as it travels up the well bore. To obtain this information, two reference levels are marked off on the column of the apparatus of the type shown in FIGURE 2. The test is then carried out in accordance with the procedure outlined immediately above, and the time in seconds required for the foam to reach each of the two aforesaid reference levels, noted.

By using this information in the equations discussed below, it is possible to determine the foam generating capacity and the travelling stability of a foam under gas drilling conditions, from which the foam index can be established. Thus, we have in the first equation the relationship:

$$(1) \qquad 1-\frac{h}{FS}=e^{(-t/S)}$$

wherein $h$=height in inches of foam above the water level
$t$=time in seconds
$F$=foam generation rate at water-foam interface—inches per second
$S$=travelling foam stability inches per inch—seconds The above relationship arises from the differential equation:

$$(2) \qquad \frac{dh}{dt}=F-\left(\frac{1}{S}\right)h$$

which states that the instantaneous rate of climb of the foam front is proportional to the rate of generation of foam at the interface less the rate at which the foam breaks.

The times at which the foam passes the two known reference levels, is needed to find the parameters F and S. S may be determined by using the equation:

$$(3) \qquad \frac{h_2}{e^{(t_1/S)}}-\frac{h_1}{e^{(t_2/S)}}=h_2-h_1$$

which is derived from Equation 1. F then can be determined by substituting the established S value in Equation 2 and solving for F. In solving for S, however, in Equation 3, numerical methods must be used involving a "pick and choose" procedure, as may be seen from the following illustration. In evaluating an aqueous solution containing 0.01 weight percent of a foaming agent prepared by condensing 2 mols of diethanolamine with 1 mol of cocoanut oil fatty acids and neutralizing the excess amine with dodecylbenzene sulfonic acid, in an apparatus of the type shown in FIGURE 2, it was found that within twenty-three seconds from the beginning of the test, the foam front passed a reference mark 47 inches above the water-foam interface. At fifty-five seconds, the foam front passed a mark 100 inches above the interface. This information when inserted in Equation 3, gives:

$$(4) \qquad \frac{100}{e^{(23/S)}}-\frac{47}{e^{(55/S)}}=53$$

It will be noted that if the correct value of S is placed in the above equation, the difference between the exponential-containing terms, will be 53. Accordingly, a guess value for S is inserted and the difference between the two terms calculated. The divergence of the difference from 53, aids in determining the next guess. Succeeding trials are made until the correct value is found. A sample computation based on the above information, follows:

TABLE I

| Trial "S" | $100/e^{(23/S)}$ | $47/e^{(55/S)}$ | Difference |
|---|---|---|---|
| 100 | 79.5 | 27.1 | 52.4 |
| 110 | 81.1 | 28.5 | 52.6 |
| 120 | 82.6 | 29.7 | 52.9 |
| 125 | 83.2 | 30.3 | 52.9 |
| 130 | 83.8 | 30.8 | 53.0 |
| 135 | 84.3 | 31.3 | 53.0 |
| 140 | 84.8 | 31.7 | 53.1 |

This series of calculations shows that the most probable value of S is about 132. F may then be found by using Equation 2. In this particular instance, the value of F is found to be 2.22.

The product of F and S may be regarded as the foam index. This is seen from an inspection of Equation 1 where it will be noted that for very great periods of time, which would correspond to the maximum height of foam obtainable under these conditions, that $e^{(-t/S)}$ approaches zero. Therefore, since $$1-\left(\frac{1}{FS}\right)h$$

also approaches zero, the maximum height would be equal to the product FS. This, of course, is found by equating $$1-\left(\frac{1}{FS}\right)h$$

to zero and solving for H.

In the table below, the foaming agents indicated were evaluated in accordance with the method previously discussed and value for SF and the foam index (FS) determined. Based on our experience in this work, a foaming agent capable of producing a foam index of at least about 200 functions satisfactorily in the process of our invention.

TABLE II

| Foaming agent | Percent in H₂O | S | F | Foaming index FS |
|---|---|---|---|---|
| (1) Condensate product of 2 mols of diethanolamine with 1 mol of cocoanut oil fatty acids, excess amine neutralized with dodecylbenzene sulfonic acid | 0.01 | 132 | 2.2 | 290 |
| Do | 0.05 | 132 | 5.4 | 712 |
| (2) Modified fatty alcohol sulfate | 0.03 | 58.8 | 2.7 | 159 |
| Do | 0.05 | 60.5 | 3.0 | 181 |
| (3) 80% Tridecyl alcohol reacted with about 15 mols of ethylene oxide, 20% inert solvent | *0.02 | 133.5 | 1.74 | 231 |
| (4) A polymer of propylene oxide with 2 ethylene oxide chains attached; molecular weight of about 8,000 of which about 80% is ethylene oxide | *0.02 | 74 | 1.7 | 126 |
| (5) Octyl phenoxy polyoxyethylene ethanol (with 9 to 10 mols of ethylene oxide) | 0.02 | 167 | 1.5 | 250 |
| (6) Nonyl phenoxy polyoxyethylene ethanol (with 30 to 35 mols of ethylene oxide) | 0.02 | 61.4 | 2.75 | 169 |

*Saturated formation brine.

It will be noted from the above table, that a number of the foaming agents, at the concentrations used, do not produce a foam index considered necessary for carrying out the process of our invention. This does not mean, however, that foaming agents such as numbers 3 and 5, for example, would not be useful if employed in somewhat higher concentrations, i.e., in the neighborhood of about 0.05 weight percent.

One of the outstanding features of our invention resides in the observation that foaming agents, having a foam index of at least about 300, as determined by the procedure taught herein, are suitable for use in gas drilling. From the previous description concerning the effect of salinity on perfermance of foaming agents, it will be apparent that the quantity of foaming agent required to give a minimum foam index of about 200 to 230, obviously will depend on the composition of the well bore liquid. Once this foam index level is obtained for the particular hole conditions involved, water and cuttings can be successfully removed from the hole. In the case of some foaming agents, of course, a foam index of 200 cannot be reached, regardless of the concentration of agent employed and the composition of the well bore liquid. Such materials are of no value for the removal of water and bit cuttings for deep wells, for example, in excess of 5,00 feet. Thus, for purposes of the present description, and when interpreting the appended claims, the value of 200, as applied to the foam index, is intended to refer to a foaming agent which can be made to produce a foam index of at least 200, as determined and defined herein.

Our invention is further illustrated in the tables appearing below, showing water-carrying capacity, cuttings-carrying capacity and foam generating ability of various foaming agents in fresh and salt water. In the first table, the water-carrying capacity and foam generating ability in fresh water of a number of foaming agents, is given. The information appearing in the table below, was obtained by using an apparatus of the type shown in FIGURE 2, in which the well bore, or column, was 5½ feet high and had an annular area of 4.47 square inches. A constant air circulation rate of 2 cubic feet per minute was supplied to a 0.75 inch drill stem extending to the bottom of the column. In this test, one liter of water containing a known concentration of foaming agent was added to the column and thereafter air circulation was initiated. The volume of foam and water removed in ten minutes, was recorded.

TABLE III

| Foaming agent | Concentration, percent by volume | Foam, volume cc. | Water, volume cc. |
|---|---|---|---|
| Condensate product of 2 mols of diethanolamine with 1 mol of cocoanut oil fatty acids, excess amine neutralized with dodecylbenzene sulfonic acid | 0.01<br>0.02<br>0.05 | 4,500<br>8,800<br>14,000 | 420<br>550<br>750 |
| Modified fatty alcohol sulfate | 0.01<br>0.05 | None<br>3,700 | None<br>250 |
| Octyl phenoxy polyoxyethylene ethanol (9 to 10 mols of ethylene oxide) | 0.01<br>0.05 | None<br>7,000 | None<br>450 |
| 80% Tridecyl alcohol reacted with about 15 mols of ethylene oxide, 20% inert solvent | 0.01<br>0.02 | 1,500<br>4,500 | 50<br>200 |
| Nonyl phenoxy polyoxyethylene ethanol (30 to 35 mols of ethylene oxide) | 0.02<br>0.05 | 3,000<br>6,200 | 345<br>490 |

The bit cutting carrying capacity of typical foaming agents having the composition indicated below, was determined also by the use of an apparatus of the type shown in FIGURE 2, however, in this particular investigation, the column or experimental well bore, was 10 feet long and had an 80 mesh screen 18 placed 2 inches above the bottom of tube 4 (drill stem) shown in FIGURE 2. Before addition of known concentrations of foaming agent, 10 grams of −40 to +80 cuttings were placed on the screen referred to. Thereafter, the foam was generated under conditions identical with those described in connection with the procurement of the data appearing in Table III above. The volume of foam and water and the weight of cuttings removed during the test period, were recorded. Typical results obtained using fresh water, appear in Table IV below:

TABLE IV

*Bit cutting carrying capacity*

| Foaming Agent | Concentration, percent by volume | Foam volume cc. | Water volume cc. | Cuttings, grams |
|---|---|---|---|---|
| Condensate product of 2 mols of diethanolamine with 1 mol of cocoanut oil fatty acids, excess amine neutralized with dodecylbenzene sulfonic acid | 0.01<br>0.02<br>0.05 | 6,500<br>6,700<br>20,500 | 325<br>350<br>625 | 1.15<br>1.70<br>2.60 |
| Modified fatty alcohol sulfate | 0.01<br>0.03<br>0.05 | None<br>2,800<br>3,700 | None<br>225<br>250 | None<br>0.39<br>1.55 |
| Octyl phenoxy polyoxyethylene ethanol having 9 to 10 ethylene oxide groups | 0.02<br>0.05 | 1,000<br>3,000 | 350<br>525 | 0.22<br>0.30 |

The following table shows the effect of saturated salt water on the bit cutting carrying capacity of various foaming agents. In obtaining these data, the procedure employed was identical with that outlined in the description associated with Table IV immediately above.

TABLE V

| Foaming Agent | Concentration, percent by volume | Foam, volume cc. | Water, volume cc. | Cuttings, grams |
|---|---|---|---|---|
| A polymer of propylene oxide with 2 ethylene oxide chains attached; molecular weight of about 8,000 of which about 80% is ethylene oxide | 0.1 | 2,000 | 150 | 1.4 |
| Octyl phenoxy polyoxyethylene ethanol (with 9 to 10 mols of ethylene oxide) | 1.0 | None | None | None |
| Nonyl phenoxy polyoxyethylene ethanol (with 30 to 35 mols of ethylene oxide) | 0.2 | 3,700 | 400 | 1.5 |
| Modified fatty alcohol sulfate | 0.5 | None | None | None |
| 80% Tridecyl alcohol reacted with about 15 mols of ethylene oxide, 20% inert solvent | 0.1<br>0.2 | 30<br>1,000 | 15<br>150 | 0.20<br>1.95 |
| 70% Condensation product of 2 mols diethanolamine and 1 mol cocoanut oil fatty acids—excess amine neutralized with dodecylbenzene sulfonic acid plus 30%* ammonium salt of the sulfate ester of nonylphenoxytetra (ethyleneoxy) ethanol | 0.5 | 6,000 | 575 | 2.2 |

*With ammonium salt of the sulfate ester of nonylphenoxytetra (ethyleneoxy) ethanol absent, very little foam was obtained and the material was totally ineffective in saturated salt water for lifting bit cuttings.

While the last product shown in column 1 of the above table is generally considered preferable for the majority of instances where it is desired to remove fresh or salt water during air drilling operations, a number of other similar materials have been found to foam very effectively in the presence of either fresh water or brine. As examples of such compositions, there may be mentioned the aforesaid condensation product neutralized with either chlorosulfonic acid, oleic acid, dodecyl sulfonic acid, and the like; combined with 30 percent nonylphenoxypoly (ethyleneoxy) ethanol (88 weight percent ethylene oxide), or a condensate of ethylene oxide with a hydrophobic base formed by condensing propylene oxide with propylene glycol, said condensate having a molecular weight of about 8000.

The process of our invention may be further illustrated by the following specific examples:

EXAMPLE 1

In a field test, an 11 inch surface hole was air drilled below 38 feet of 13⅜ inch conductor pipe. At a depth of 65 feet, damp hole conditions decreased the return of cuttings, and at 95 feet, the return air contained no cuttings and had a humidity of 100 percent. When the pipe was raised, it stuck at a depth of 75 feet and air circulation was lost. Approximately 20 barrels (42 gallons per barrel) of water and 4 pounds of a foaming agent, consisting of a condensation product of 2 mols diethanolamine with 1 mol of cocoanut oil fatty acids having the excess amine neutralized with dodecylbenzene sulfonic acid, were added to the air line during a thirty minute period, while the bit was slowly lowered back to bottom. During this time, air was being circulated at the rate of 1,200 cubic feet per minute. Thick foam, mud cake, and mud balls, ranging in size of from about 0.5 inch to about 2 inches, were circulated out of the hole. Thereafter, the hole was maintained in a clean condition and drilled to casing point without difficulty. When the drill pipe was pulled up, a mud ring was encountered at 95 feet. One-half barrel of water and 0.1 pound of the above-mentioned foaming agent, were injected into the air stream, which effectively cleaned the hole. While drilling on at a depth of 2,122 feet, an estimated 20 barrels of water entered the well within one minute. This flow was estimated at 250 barrels per hour and was more than the air available could handle. However, it was found that 90 barrels of water per hour in the form of a smooth wet foam, could be lifted from 1,130 feet with 1,200 cubic feet per minute air and the addition of 16 pounds per hour of said foaming agent.

EXAMPLE 2

In this particular test, a 6¾ inch hole was being drilled with natural gas as the circulating fluid, the gas being injected at the rate of 1,500 cubic feet per minute. At a depth of 4,917 feet, a small quantity of water was encountered which caused the flow of dust to stop. Normal practice of blowing the hole dry and drilling ahead was used for eleven and one-half hours to drill 4,958 feet. At this depth, mud rings in the hole had started causing excessive drag on the pipe and reduced the gas flow. As soon as it was apparent that normal gas drilling could not be continued, 4 pounds of the foaming agent, mentioned in Example 1, in 10 barrels of water, were injected. This treatment removed the mud rings and wet cuttings which had accumulated in the hole. The average treatment required to maintain a satisfactory foam while drilling, was found to be approximately 1.4 pounds of said foaming agent in 7 barrels of water per hour. This treatment was used to drill the interval from 4,950 feet to 5,984 feet in twenty-eight and one-half hours drilling time. One trip was made during this period and the hole was found to be open and free of cuttings.

EXAMPLE 3

In this test, gas was being used as the circulating fluid to drill a 9⅝ inch hole, when water was encountered at a depth of 6,200 feet. The average well production was 15 barrels of a medium, i.e., about 5 percent salt, brine, and 1 barrel of oil per hour. Foaming agent of the type specified in Example 1 was used. The quantity of agent employed under the conditions of water influx and salinity indicated, amounted to about 3 pounds per hour, as determined by reference to FIGURE 1. A slight excess of foaming agent was used because of the presence of oil. Operations were successfully continued and in sixteen days the well had been drilled to 8,038 feet. Water production appeared to be from zones above 7,500 feet, therefore an effort was made to keep the bottom of the hole dry and use a foaming agent prepared from a polymer of propylene oxide having 2 ethylene oxide chains attached. This polymer has a molucular weight of about 8,000 of which approximately 80 percent of its content is ethylene oxide. It is known to the trade as Pluronic F-68. This last-mentioned foam-agent was used to foam the water above the water-bearing zones. However, such procedure was not satisfactory because the bottom of the hole could not be kept dry. The most economic treatment to keep the hole free of cuttings, was found to involve the addition of 2 pounds of the foaming agent disclosed in Example 1, 1 pound of calcium ligno sulfonate, ¼ pound of caustic soda and 10 barrels of water per hour. The results indicated that the addition of the calcium ligno sulfonate and caustic soda, tended to stabilize the foam produced when the entering water contained salts, such as sodium chloride, calcium chloride and calcium sulfate. At a depth of 8,038 feet, a large decrease in the gas supply forced discontinuance of gas drilling. However, the results secured up to that time, showed that the aforesaid foaming agent could be used in gas drilling in the presence of a well bore liquid containing water and oil.

We claim:
1. In a method of drilling a well in which gas is used as the circulation fluid and wherein the rate of influx of aqueous formation fluid selected from the group consisting of fresh water and salt water brine is sufficiently high to interfere with the effective removal of cuttings from said well during the drilling thereof, the improvement which comprises adding to the well bore liquid a sufficient quantity of a foaming agent to produce a mixture having a foam index in said brine of at least about 200 to 230, said agent being a condensation product obtained by reacting approximately 2 mols of diethanolamine with about 1 mol of a $C_{12}$ to $C_{14}$ fatty acid and neutralizing the excess amine, and a solubilizing agent for said product selected from the group consisting of alkali and alkaline earth metal salts of sulfate esters of alkylated phenols having from about 4 to about 40 ethylene oxide groups linked to the oxygen atom of the phenol group and from about 8 to 18 carbon atoms in the alkyl side chain, nonylphenoxypoly (ethyleneoxy) ethanol, about 88 weight percent of which is ethylene oxide, and a condensate of ethylene oxide with a hydrophobic base formed by condensing propylene oxide with propylene glycol and having a molecular weight of about 8,000 in which said solubilizing agent is present in a concentration of from about 25 to about 50 weight percent of the total mixture, and thereafter removing said formation fluid from the well bore in the form of a foam.

2. The process of claim 1 in which the quantity of foaming agent employed for a fluid of given strength and produced at a specified rate is determined by reference to FIGURE 1.

References Cited by the Examiner
UNITED STATES PATENTS

| | | | |
|---|---|---|---|
| Re. 23,840 | 6/1954 | Vitale et al. | 252—152 |
| 2,586,496 | 2/1952 | Young et al. | 252—117 |
| 2,599,391 | 6/1952 | Katzman | 260—401 |
| 2,607,740 | 8/1952 | Vitale et al. | 252—152 |
| 2,766,212 | 10/1956 | Grifo | 252—152 |

FOREIGN PATENTS 729,531   5/1955   Great Britain.

OTHER REFERENCES

Murray et al.: Water Still Poses Tough Problems in Drilling With Air in the Oil and Gas Journal, June 10, 1957, pp. 105 to 112.

CHARLES E. O'CONNELL, *Primary Examiner.*